(12) United States Patent
Fare et al.

(10) Patent No.: US 7,136,623 B2
(45) Date of Patent: Nov. 14, 2006

(54) SELF-SERVICE SYSTEM AND METHOD OF LOADING AN EXECUTABLE TRANSACTION APPLICATION PROGRAM FROM A SELF-SERVICE TERMINAL TO A PORTABLE ELECTRONIC DEVICE

(75) Inventors: James W. D. Fare, Waterloo (CA); Sean Woodward, Waterloo (CA); Kenneth G. De Souza, Kitchener (CA)

(73) Assignee: NCR Corporation, Dayton, OH (US)

( * ) Notice: Subject to any disclaimer, the term of this patent is extended or adjusted under 35 U.S.C. 154(b) by 571 days.

(21) Appl. No.: 10/260,316

(22) Filed: Sep. 30, 2002

(65) Prior Publication Data

US 2004/0204078 A1    Oct. 14, 2004

(51) Int. Cl.
*H04B 7/00* (2006.01)
(52) U.S. Cl. ............... 455/41.2; 455/414.1; 455/414.3; 455/418; 455/420; 455/456.1; 455/556.1; 455/556.2; 705/42; 705/43; 235/379
(58) Field of Classification Search ...... 455/41.1–41.2, 455/414.1–414.4, 418–420, 456.1–456.2, 455/88, 550.1, 552.1, 557, 556.1–556.2; 705/42–43, 14; 379/92.01–92.04, 93.11–93.13; 235/379–380
See application file for complete search history.

(56) References Cited

U.S. PATENT DOCUMENTS

| 6,452,498 | B1 * | 9/2002 | Stewart ............... 340/573.1 |
| 6,658,248 | B1 * | 12/2003 | Lee ..................... 340/5.9 |
| 6,796,490 | B1 * | 9/2004 | Drummond et al. ........ 235/379 |
| 2001/0051922 | A1 * | 12/2001 | Waller et al. ............... 705/43 |
| 2002/0099658 | A1 * | 7/2002 | Nielsen et al. ............. 705/43 |
| 2002/0138433 | A1 * | 9/2002 | Black et al. ............... 705/43 |
| 2003/0208446 | A1 * | 11/2003 | Janne ......................... 705/41 |

* cited by examiner

Primary Examiner—Matthew D. Anderson
Assistant Examiner—Tuan Tran
(74) Attorney, Agent, or Firm—Michael Chan

(57) ABSTRACT

A self-service terminal has a wireless communication port for communicating with a user's portable electronic device. The self-service terminal loads an executable transaction application program via the wireless communication port to a user's portable electronic device when the user's portable electronic device moves into the vicinity of the wireless communication port. The self-service terminal receives transactional data from a user's portable electronic device when an executable transaction application program which has been loaded to the user's portable electronic device is executed.

6 Claims, 8 Drawing Sheets

SELF-SERVICE SYSTEM AND METHOD OF LOADING AN EXECUTABLE TRANSACTION APPLICATION PROGRAM FROM A SELF-SERVICE TERMINAL TO A PORTABLE ELECTRONIC DEVICE

BACKGROUND OF THE INVENTION

The present invention relates to self-service transactions, and is particularly directed to a self-service system and a method of loading an executable transaction application program from a self-service terminal to a portable electronic device.

In a known advertisement system, advertisement information is loadable from a base terminal to portable electronic devices which are located in the vicinity of the base terminal. The advertisement information is loaded from the base terminal to a portable electronic device when a detector associated with the base terminal detects that the portable electronic device has moved within a predetermined distance from the detector. The loaded advertisement information is viewable by a user carrying the portable electronic device. Although the advertisement system provides useful information, the advertisement system is clearly not a self-service system in which users of portable electronic devices can carry out self-service transactions.

In a known self-service system, a self-service terminal user is able to carry out a self-service transaction at a self-service terminal, such as an automated teller machine (ATM), by using a portable electronic device, such as a cellular phone. The portable electronic device needs to be preloaded with the required executable transaction application program before the user can use the portable electronic device to carry out the desired transaction at the self-service terminal. If the portable electronic device has not been preloaded with the required executable transaction application program, then the user is unable to carry out the transaction at the self-service terminal.

The fact that the required executable transaction application program needs to be preloaded onto the portable electronic device places a burden upon the user of the portable electronic device to insure that the executable transaction application program is properly and timely preloaded. This burden increases substantially if the user has to insure that a number of different executable transaction application programs need to be preloaded before the user can carry out transactions at different types of self-service terminals. It would desirable to be able eliminate or at least reduce the burden upon the user to make sure that all required executable transaction application programs are properly preloaded onto his/her portable electronic device.

SUMMARY OF THE INVENTION

In accordance with one aspect of the present invention, a self-service terminal comprises a wireless communication port for communicating with a user's portable electronic device and means for loading an executable transaction application program via the wireless communication port to a user's portable electronic device when the user's portable electronic device moves into the vicinity of the wireless communication port. The self-service terminal may further comprise means for receiving transactional data from a user's portable electronic device when an executable transaction application program which has been loaded to the user's portable electronic device is executed.

In accordance with another aspect of the present invention, a self-service terminal comprises a wireless communication port for communicating with a user's portable electronic device, and means for, without any action required of the user, loading an executable transaction application program via the wireless communication port to a user's portable electronic device when the user's portable electronic device moves within a predetermined distance from the wireless communication port. The self-service terminal may further comprise means for receiving transactional data from a user's portable electronic device when an executable transaction application program which has been loaded to the user's portable electronic device is executed.

In accordance with still another aspect of the present invention, a portable electronic device comprises a wireless communication port for communicating with a self-service transaction terminal, means for receiving an executable transaction application program from a self-service transaction terminal when the wireless communication port moves into the vicinity of the self-service transaction terminal, a user interface for allowing a user to enter a transaction, and means for executing an executable transaction application program received from a self-service transaction terminal to carry out a transaction entered via the user interface.

In accordance with yet another aspect of the present invention, A self-service system comprises a first self-service terminal of a first type including (i) a first wireless communication port for interfacing with a portable electronic device, and (ii) means for loading an executable transaction application program via the first wireless communication port to a portable electronic device. The system further comprises a second self-service terminal of a second type which is different from the first type and including (i) a second wireless communication port for interfacing with a portable electronic device, and (ii) means for loading an executable transaction application program via the second wireless communication port to a portable electronic device, The system also comprises a portable electronic device including (i) a third wireless communication port for interfacing with the first wireless communication port of the first self-service terminal and for interfacing with the second wireless communication port of the second self-service terminal, and (ii) means for receiving an executable transaction application program from the first self-service terminal when the portable electronic device moves within the first predetermined distance from the first self-service terminal and for receiving an executable transaction application program from the second self-service terminal when the portable electronic device moves within the second predetermined distance from the second self-service terminal.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
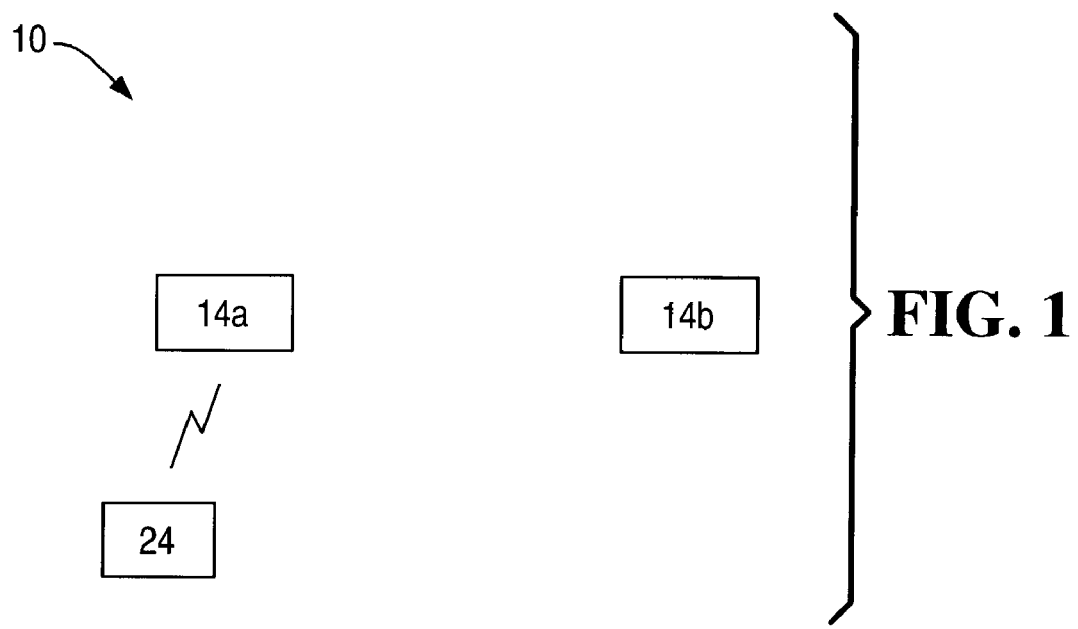
FIG. 1 is a block diagram of a self-service system in accordance with the present invention.

The present invention is directed to a self-service system and a method of loading an executable transaction application program from a self-service terminal to a portable electronic device. Referring to FIG. 1, a self-service system 10 includes a plurality of types of self-service terminals 14a, 14b. For example, the self-service terminal 14a may comprise a soda pop vending machine, and the self-service terminal 14b may comprise an automated teller machine (ATM). The self-service system 10 further includes a portable electronic device 24 which is, preferably, in the form of a personal digital assistant (hereinafter referred to as a PDA). A suitable PDA includes Compaq's iPAQ (trademark) personal digital assistant offered by Compaq Corporation. Preferably, the PDA 24 uses Microsoft's Window CE 2002 (trademark) operating system offered by Microsoft Corporation. Also, preferably, the PDA 24 is enabled for wireless communication using known Bluetooth (trademark) wireless technology offered by Bluetooth SIG, Inc.

Figure 2:
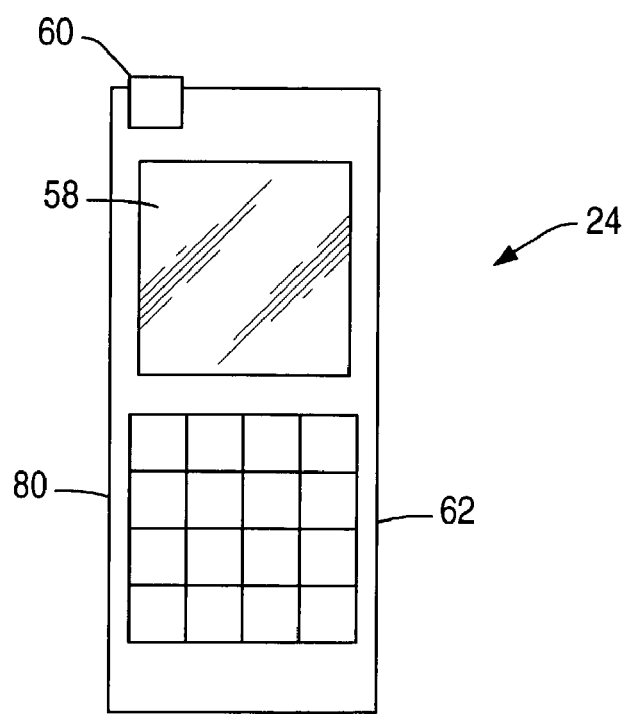
FIG. 2 is a front view of a portable electronic device shown in the self-service system of FIG. 1.
Figure 3:
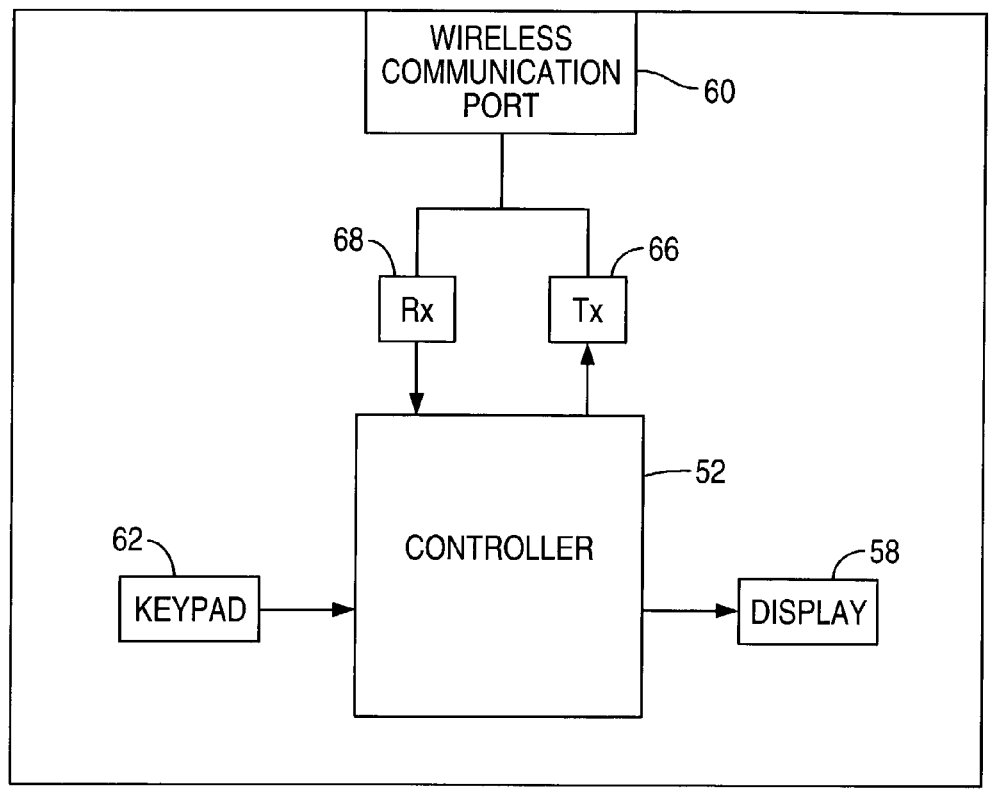
FIG. 3 is a block diagram of the portable electronic device of FIG. 2.
Figure 4:
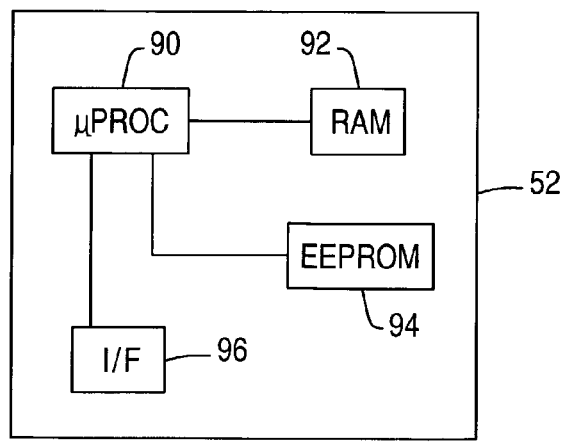
FIG. 4 is a block diagram of a controller in the portable electronic device of FIG. 2.

Referring to FIGS. 2, 3, and 4, the PDA 24 includes a body 80 housing a controller 52, a keypad 62, a graphics display 58, and a communication port 60 which uses Bluetooth wireless technology. Data is received and transmitted via the port 60 using TCP/IP protocol. The PDA 24 further includes an RF transmitter circuit 66 and an RF receiver circuit 68. The controller 52, which is responsible for the operation of the PDA 24, comprises a microprocessor 90, a volatile memory 92, a non-volatile memory 94, and an interface 96 for outputting and for receiving control signals. As is known to those of skill in the art, the non-volatile memory 94, which may be EEPROM, stores control programs required for radio communication and for controlling the port 60.

When a user operates the PDA 24, the PDA executes a routine in the control programs for transmitting and receiving signals via the port 60. As is also known to those of skill in the art, the volatile memory 92, which may be RAM, records transmission and reception control information required for radio communication. The microprocessor 90 uses the stored control programs to execute control processes relating to radio communication. In use, the microprocessor 90 loads the required control programs from the EEPROM 94 into the RAM 92.

Figure 5:
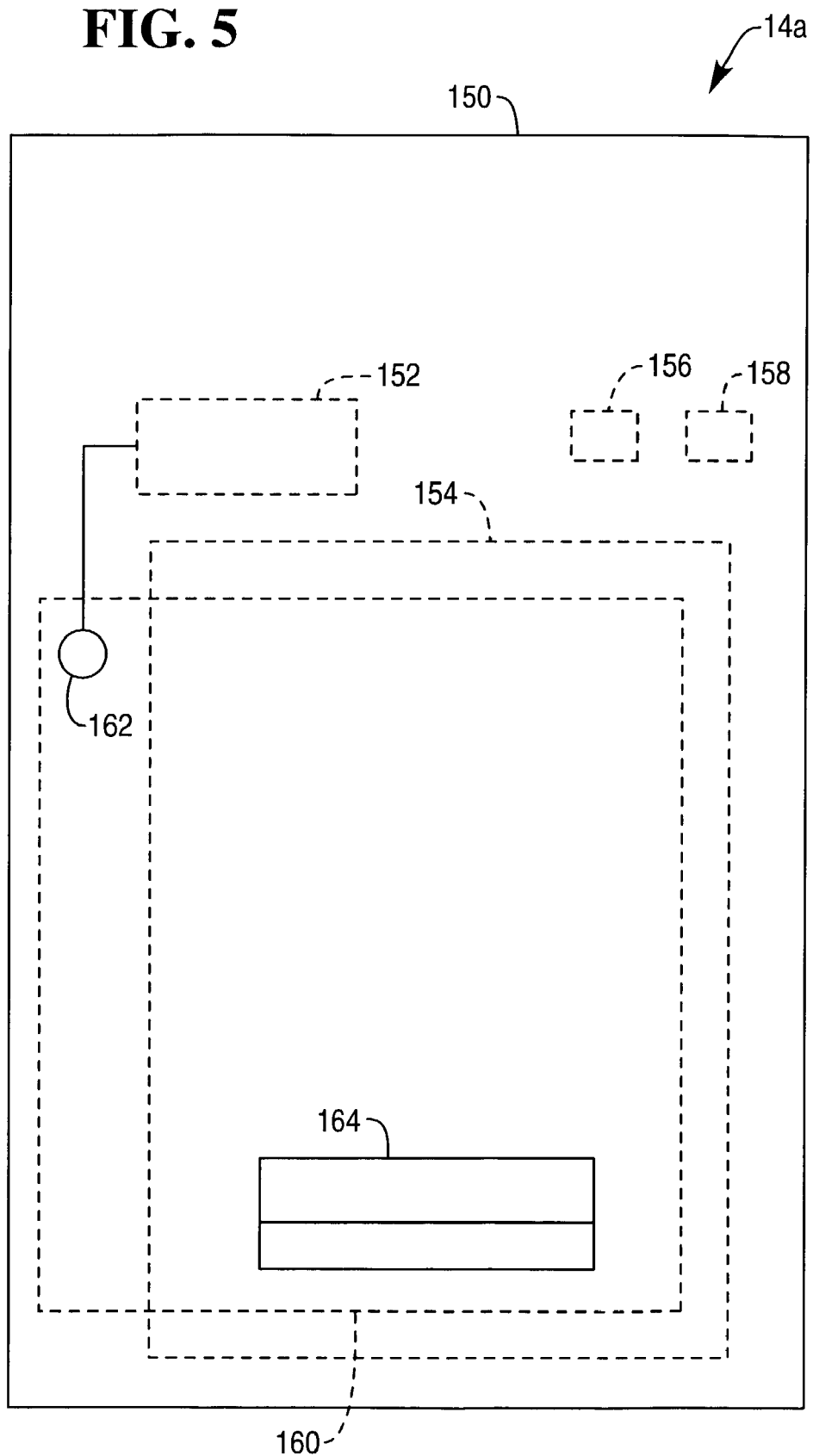
FIG. 5 is a schematic front diagram of one type of self-service terminal shown in the self-service system of FIG. 1.

Referring to FIG. 5, the one type of self-service terminal in the form of the soda pop vending machine 14a includes a housing 150 which houses a processing module 152 coupled to a dispenser 154. The dispenser 154 includes, preferably, a soda can or bottle type of dispenser. The processing module 152 includes volatile memory 156 and non-volatile memory 158. The soda pop vending machine 14a includes a user interface 160 having a wireless communication port 162 coupled to the processor 152, and a dispense area 164 in the form of a tray for receiving soda cans or soda bottles. The port 162 uses Bluetooth wireless technology. Data is received and transmitted via the port 162 using TCP/IP protocol.

Figure 6:
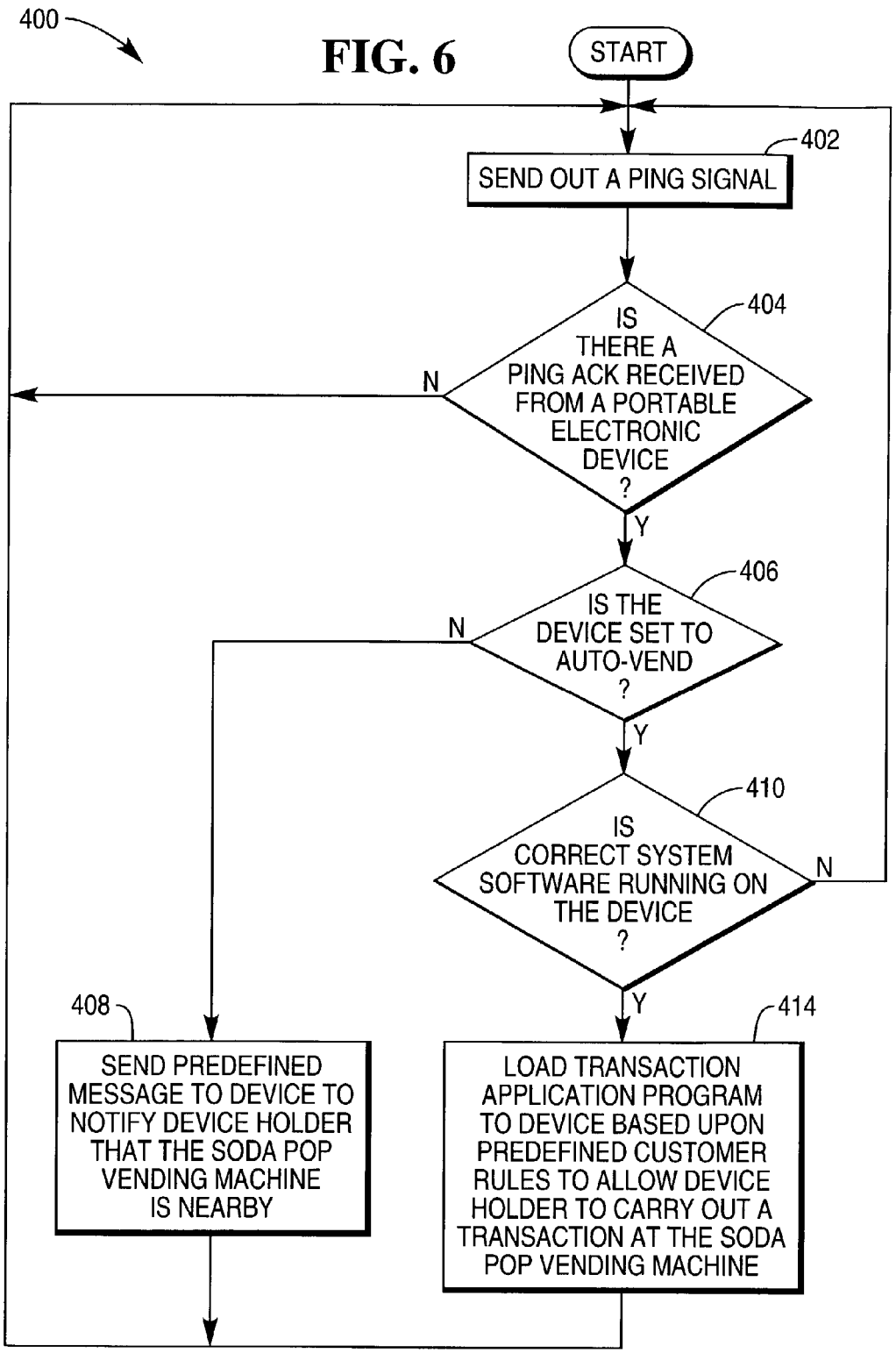
FIG. 6 is a flowchart depicting a process carried out by the self-service terminal of FIG. 5 when the portable electronic device of FIG. 2 moves into the vicinity of the self-service terminal.

Referring to FIG. 6, a flowchart 400 depicts a process carried out by the soda pop vending machine 14a when the PDA 24 moves within a predetermined distance from the soda pop vending machine 14a. As shown in step 402, the soda pop vending machine 14a sends out a ping signal. A determination is made in step 404 as to whether or not the soda pop vending machine 14a has received a "ping acknowledgement" signal from the PDA 24 in response to the PDA detecting the ping signal from the soda pop vending machine 14a. The predetermined distance at which the PDA 24 detects the ping signal from the soda pop vending machine 14a and sends out its ping acknowledgement signal will depend upon a number of factors including the wireless communication technology used, settings associated with the soda pop vending machine 14a, and settings associated with the PDA 24. If the determination in step 404 is negative, the program loops back to step 402 and continues to send out a ping signal to monitor for the presence of portable electronic devices in the vicinity of the soda pop vending machine 14a.

However, if the determination in step 404 is affirmative, the program proceeds to step 406 in which a determination is made as to whether or not the PDA 24 just detected in the vicinity of the soda pop vending machine 14a is set to "auto-vend" mode. Auto-vend mode is settable by the user of the PDA 24 and, when set, allows the PDA to receive an executable transaction application program from a self-service terminal such as the soda pop vending machine 14a. If the determination in step 406 is negative, the program proceeds to step 408 in which the soda pop vending machine 14a sends a predefined message to the PDA 24 to inform the user of the PDA that the soda pop vending machine 14a is nearby. The message may be displayed on the display 58 of the PDA 24. The program then returns to step 402 to continue sending out a ping signal to monitor for the presence of portable electronic devices in the vicinity of the soda pop vending machine 14a.

However, if the determination in step 406 is affirmative, the program proceeds to step 410 in which a determination is made as to whether or not the correct system software is running on the PDA 24. If the determination in step 410 is negative, then the program proceeds back to step 402 to continue sending out a ping signal to monitor for the presence of portable electronic devices in the vicinity of the soda pop vending machine 14a. However, if the determination in step 410 is affirmative, then the program proceeds to step 414 in which the soda pop vending machine 14a loads a soda pop dispense transaction application program to the PDA 24 to allow the user to carry out a soda pop dispensing transaction with the soda pop vending machine 14*a*. Preferably, the soda pop dispense transaction application program is loaded to the PDA 24 based upon predefined customer rules. For example, the predefined customer rules may include loading of coupons whenever a portable electronic device, such as the PDA 24, is detected in the vicinity of the soda pop vending machine 14*a*. The program then returns to step 402 to continue sending out a ping signal to monitor for the presence of portable electronic devices in the vicinity of the soda pop vending machine 14*a*.

Figure 7:
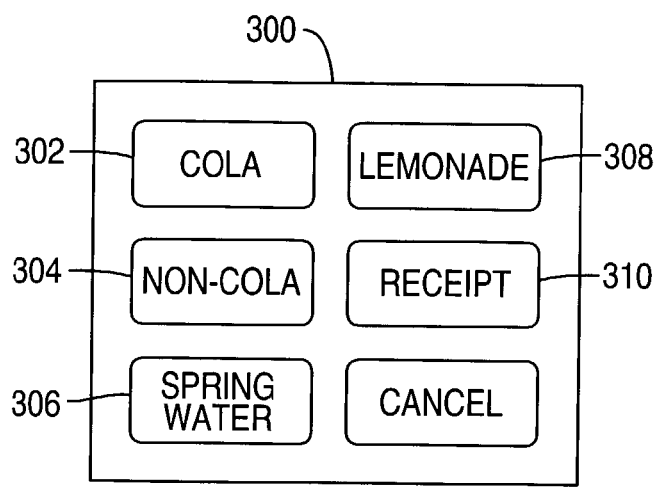
FIG. 7 is a front view of a display of the portable electronic device of FIG. 2 during preparation of a transaction to be carried out at the self-service terminal of FIG. 5.

The loaded soda pop dispense transaction application program provides the user of the PDA 24 with a user interface for preparing soda pop dispensing transactions for executing on the soda pop vending machine 14*a*. When the soda pop dispense transaction program is selected by the user of the PDA 24, the PDA displays a series of screens on the display 58 to allow the user to select a particular brand of soda pop to be dispensed by the soda pop vending machine 14*a*. A typical screen 300 is shown in FIG. 7, which shows various types of available drinks which the soda pop vending machine 14*a* is capable of dispensing to the user. For example, the soda pop vending machine 14*a* may have a cola type of drink 302, a non-cola type of drink 304, a spring water type of drink 306, and a lemonade 306. The soda pop vending machine 14*a* may also have a download receipt option 310. The sequence of screens and the content of each screen may be customized by the user. As the user carries his/her own graphical user interface, no graphical user interface is required on soda pop vending machine 14*a*.

Figure 8:
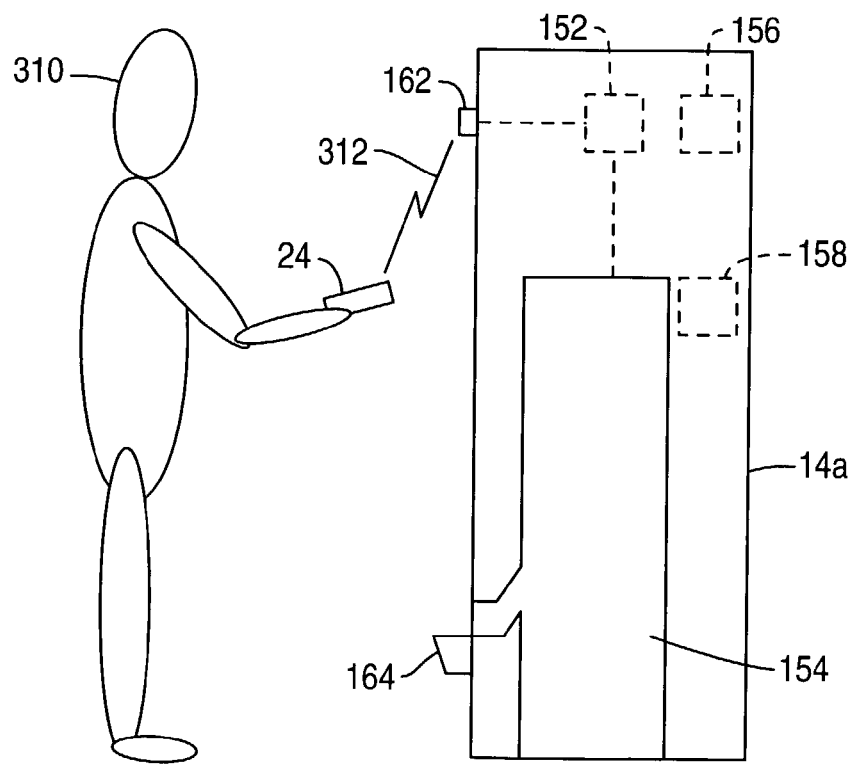
FIG. 8 is a schematic diagram illustrating a user operating the portable electronic device of FIG. 2 in the vicinity of the self-service terminal of FIG. 5.

Referring to FIG. 8, when a user 310 wishes to dispense soda pop from the soda pop vending machine 14*a*, the user 310 executes the loaded soda pop dispense transaction program on the PDA 24, and prepares a soda pop dispensing transaction. The user 310 prepares a soda pop dispensing transaction by using the display 58 (FIG. 2) and selecting an option representing the type of soda pop, such as a non-cola type of drink (304 in FIG. 7). The soda pop dispensing transaction can be prepared remotely from the soda pop vending machine 14*a* or in the vicinity of the soda pop vending machine. The controller 52 uses the soda pop dispense transaction program to prepare an authorization request that includes the user's account details, and the prepared transaction requested (dispense a non-cola type of drink). When the PDA 24 receives a transaction authorization, the user 310 may execute the soda pop dispensing transaction. To execute the soda pop dispensing transaction, the user 310 transmits the received transaction authorization to the soda pop vending machine 14*a* via the communication port 162, as illustrated by zigzag line 312.

After the user 310 has carried out the soda pop dispensing transaction, the user may delete the soda pop dispense transaction program from the PDA 24. Other alternatives are possible. For example, the user 310 may leave the soda pop dispense transaction program on the PDA 24 until another transaction application program which is loaded onto the PDA at a later time overwrites the soda pop dispense transaction program. As another example, the user 310 may configure the PDA 24 such the soda pop dispense transaction program is automatically deleted, without any operator intervention, immediately after the soda pop dispensing transaction has been carried out.

Figure 9:
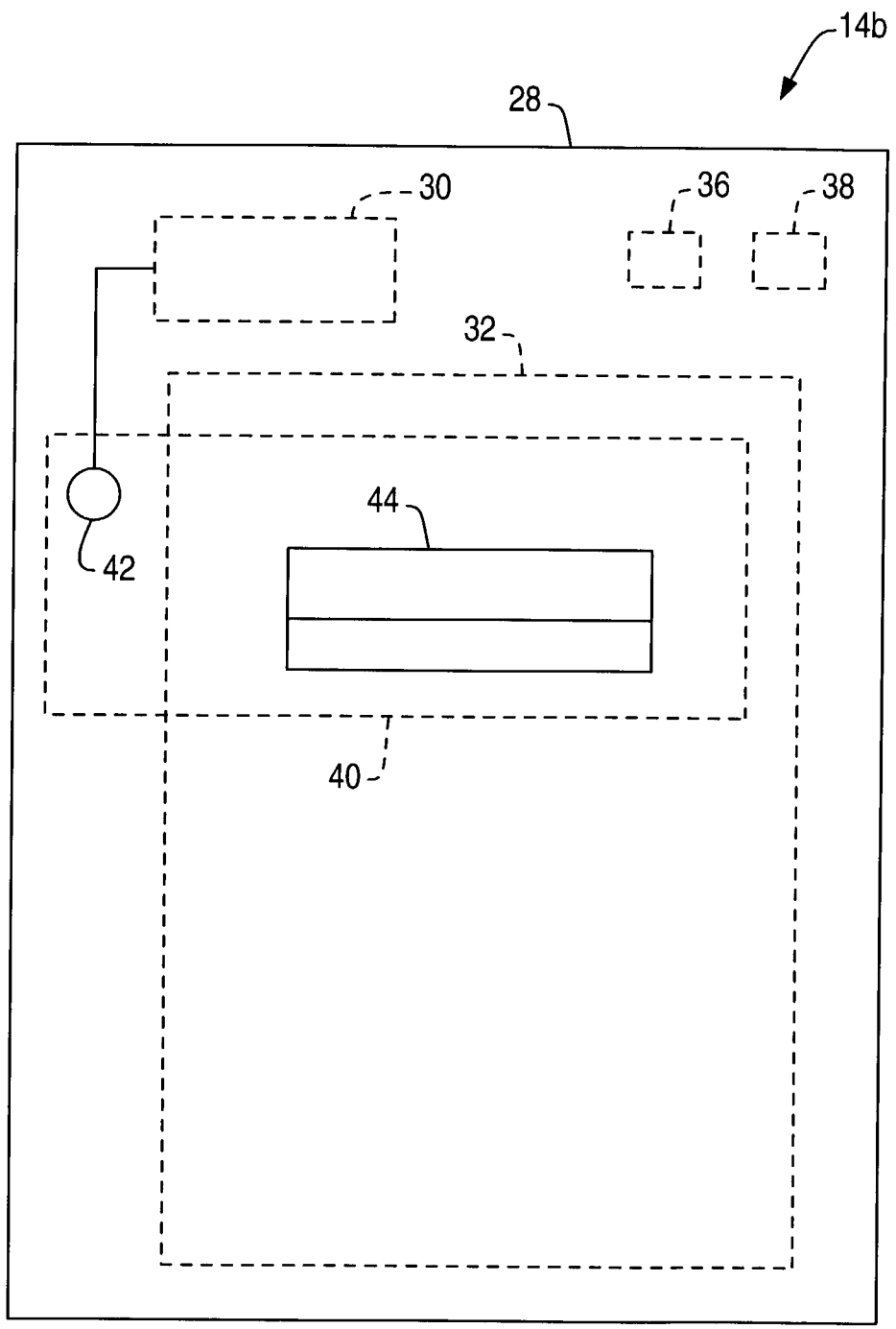
FIG. 9 is a schematic front diagram of another type of self-service terminal shown in the self-service system of FIG. 1.

Referring to FIG. 9, the other type of self-service terminal in the form of the ATM 14*b* includes a safe 28 which houses a processing module 30 coupled to a dispenser 32. The dispenser 32 includes, preferably, a cash dispenser. The processing module 30 includes volatile memory 36 and non-volatile memory 38. The ATM 14*b* includes a user interface 40 having a wireless communications port 42 coupled to the processor 30, and a dispense area 44 in the form of a tray for receiving currency notes. The port 42 uses known Bluetooth wireless technology. Data is received and transmitted via the port 42 using TCP/IP protocol.

Figure 10:
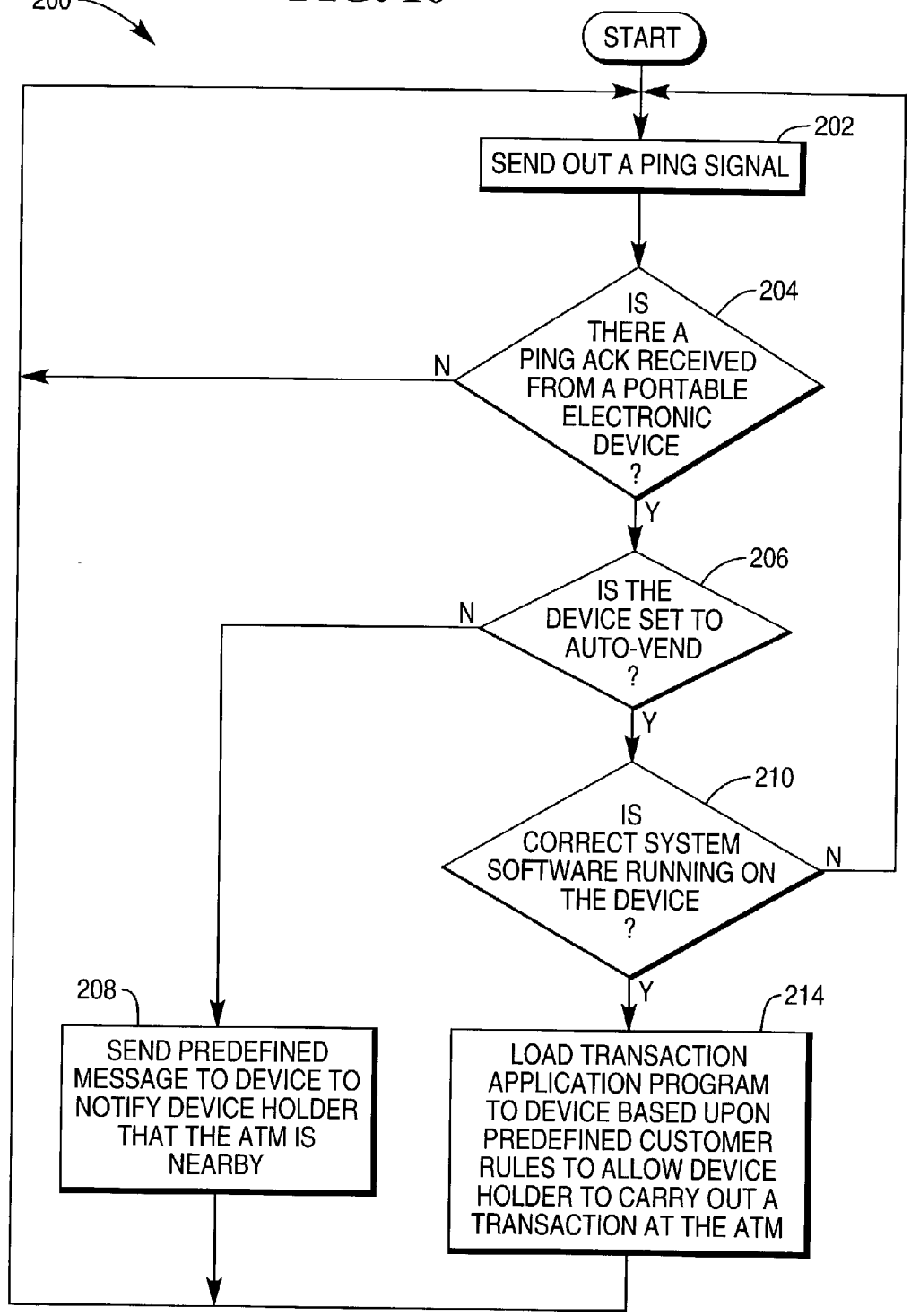
FIG. 10 is a flowchart depicting a process carried out by the self-service terminal of FIG. 9 when the portable electronic device of FIG. 2 moves into the vicinity of the self-service terminal.

Referring to FIG. 10, a flowchart 200 depicts a process carried out by the ATM 14*b* when the PDA 24 moves within a predetermined distance from the ATM 14*b*. As shown in step 202, the ATM 14*b* sends out a ping signal. A determination is made in step 204 as to whether or not the ATM 14*b* has received a "ping acknowledgement" signal from the PDA 24 in response to the PDA detecting the ping signal from the ATM 14*b*. The predetermined distance at which the PDA 24 detects the ping signal from the ATM 14*b* and sends out its ping acknowledgement signal will depend upon a number of factors including the wireless communication technology used, settings associated with the ATM 14*b*, and settings associated with the PDA 24. If the determination in step 204 is negative, the program loops back to step 202 and continues to send out a ping signal to monitor for the presence of portable electronic devices in the vicinity of the ATM 14*b*.

However, if the determination in step 204 is affirmative, the program proceeds to step 206 in which a determination is made as to whether or not the PDA 24 just detected in the vicinity of the ATM 14*b* is set to "auto-vend" mode. Auto-vend mode is settable by the user of the PDA 24 and, when set, allows the PDA to receive an executable transaction application program from a self-service terminal such as the ATM 14*b*. If the determination in step 206 is negative, the program proceeds to step 208 in which the ATM 14*b* sends a predefined message to the PDA 24 to inform the user of the PDA that the ATM 14*b* is nearby. The message may be displayed on the display 58 of the PDA 24. The program then returns to step 202 to continue sending out a ping signal to monitor for the presence of portable electronic devices in the vicinity of the ATM 14*b*.

However, if the determination in step 206 is affirmative, the program proceeds to step 210 in which a determination is made as to whether or not the correct system software is running on the PDA 24. If the determination in step 410 is negative, then the program proceeds back to step 202 to continue sending out a ping signal to monitor for the presence of portable electronic devices in the vicinity of the ATM 14*b*. However, if the determination in step 410 is affirmative, then the program proceeds to step 414 in which the ATM 14*b* loads an ATM transaction application program to the PDA 24 to allow the user to carry out an ATM transaction with the ATM 14*b*. Preferably, the ATM transaction application program is loaded to the PDA 24 based upon predefined customer rules. For example, the predefined customer rules may include loading of coupons whenever a portable electronic device, such as the PDA 24, is detected in the vicinity of the ATM 14*b*. The program then returns to step 202 to continue sending out a ping signal to monitor for the presence of portable electronic devices in the vicinity of the ATM 14*b*.

Figure 11:
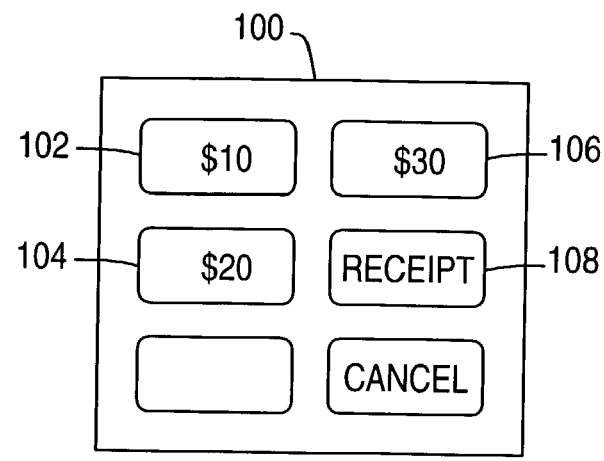
FIG. 11 is a front view of a display of the portable electronic device of FIG. 2 during preparation of a transaction to be carried out at the self-service terminal of FIG. 9.

The loaded ATM transaction application program provides the user of the PDA 24 with a user interface for preparing ATM transactions for executing on the ATM 14*b*. When the ATM transaction application program is selected by the user of the PDA 24, the PDA displays a series of screens on the display 58 in a similar way to a conventional ATM display. A typical screen 100 appearing on the display 58 is shown in FIG. 11, which shows various cash withdrawal options, such as ten dollars 102, twenty dollars 104, thirty dollars 106, and a download receipt option 108. The sequence of screens and the content of each screen may be customized by the user. As the user carries his/her own graphical user interface, no graphical user interface is required on ATM 14*b*.

Figure 12:
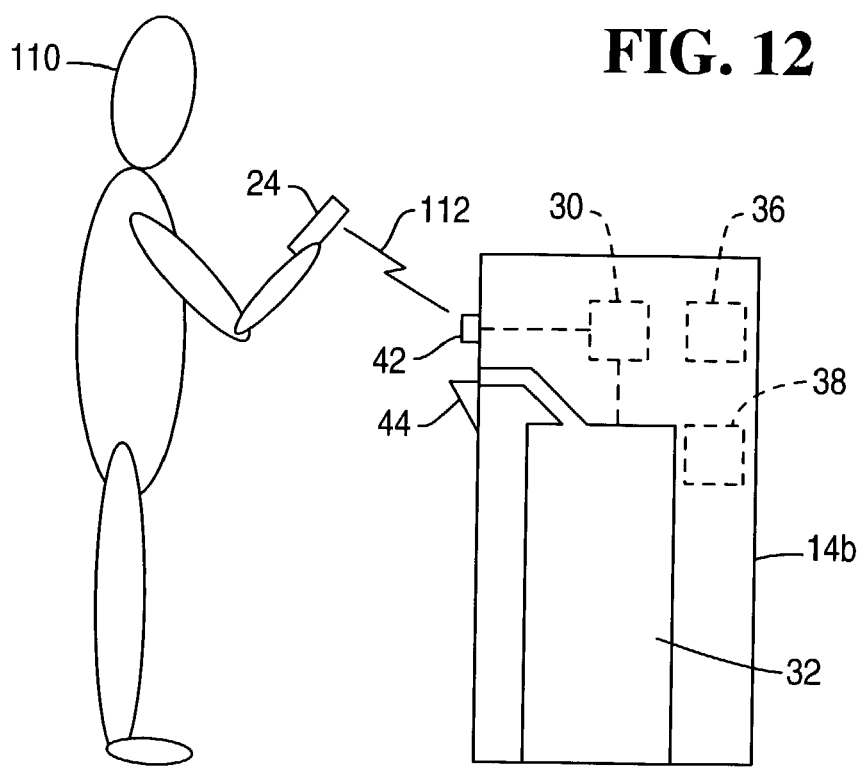
FIG. 12 is a schematic diagram illustrating a user operating the portable electronic device of FIG. 2 in the vicinity of the self-service terminal of FIG. 9.

Referring to FIG. 12, when a user 110 wishes to withdraw cash from the ATM 14*b*, the user 110 executes the loaded ATM transaction application program on the PDA 24, and prepares an ATM transaction. The user 110 prepares the ATM transaction by entering his/her PIN using the display 58 (FIG. 2) and selecting an option representing an amount to be withdrawn, such as twenty dollars (104 in FIG. 11). The transaction can be prepared remotely from the ATM 14*b* or in the vicinity of the ATM. The controller 52 uses the ATM transaction application program to prepare an authorization request that includes the user's account details, the user's PIN, and the prepared transaction requested (withdraw twenty dollars). When the PDA 24 receives a transaction authorization, the user 110 may execute the ATM transaction. To execute the ATM transaction, the user 110 transmits the received transaction authorization to the ATM 14*b* via the communication port 42, as illustrated by zigzag line 112.

A number of advantages result by providing a self-service system in accordance with the present invention. One advantage is that the user is not be burdened with a task of making sure that all required transaction application programs are properly preloaded onto his/her portable electronic device. Corresponding transaction application programs are loaded to the portable electronic device of the user as the user moves into the vicinity of different types of self-service terminals.

Although the above description describes a self-service terminal in the form of a soda pop vending machine and a self-service terminal in the form of an ATM, it is contemplated that the self-service terminal may include some other type of vending machine or a point-of-sale (POS) terminal, for examples. Moreover, although the above description describes using Bluetooth wireless technology for communication between the self-service terminal and the portable electronic device, it is conceivable that another type of wireless technology be used. For example, infrared technology may be used.

Various modifications may be made to the above-described embodiments within the scope of the invention. For example, in other embodiments, the portable electronic device may be a cellphone, an Internet access device, or such like. In other embodiments, items other than soda pop or cash may be dispensed. In other embodiments, the self-service terminal may include a storage area for receiving items from a user. Such a storage area may be used in addition to or instead of a dispenser. In other embodiments, carrying out a self-service transaction may involve allowing a user to use one or more of the facilities provided by the self-service terminal, for example, a printing facility, a display, or such like.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service terminal comprising:
    a wireless communication port for communicating with a user's portable electronic device;
    means for detecting presence of the portable electronic device in the vicinity of the self-service terminal;
    means for determining if correct system software is running on the portable electronic device in response to presence of the portable electronic device in the vicinity of the self-service terminal being detected; and
    means for loading an executable transaction application program via the wireless communication port to a user's portable electronic device when the user's portable electronic device moves into the vicinity of the wireless communication port and a determination is made that correct software is running on the portable electronic device.

2. A self-service terminal according to claim 1, further comprising means for receiving transactional data from a user's portable electronic device when an executable transaction application program which has been loaded to the user's portable electronic device is executed.

3. A self-service terminal comprising:
    a wireless communication port for communicating with a user's portable electronic device;
    means for detecting presence of the portable electronic device in the vicinity of the self-service terminal;
    means for determining if correct system software is running on the portable electronic device in response to presence of the portable electronic device in the vicinity of the self-service terminal being detected; and
    means for, without any action required of the user, loading an executable transaction application program via the wireless communication port to a user's portable electronic device when the user's portable electronic device moves within a predetermined distance from the wireless communication port and a determination is made that correct software is running on the portable electronic device.

4. A self-service terminal according to claim 3, further comprising means for receiving transactional data from a user's portable electronic device when an executable transaction application program which has been loaded to the user's portable electronic device is executed.

5. A method of operating a self-service terminal to download an executable transaction application program via a wireless communication port from the self-service terminal to a portable electronic device, the method comprising the steps of:
    detecting presence of the portable electronic device in the vicinity of the self-service terminal;
    determining if correct system software is running on the portable electronic device in response to presence of the portable electronic device in the vicinity of the self-service terminal being detected; and
    downloading the executable transaction application program via the wireless communication port to the portable electronic device when a determination is made that correct software is running on the portable electronic device.

6. A method according to claim 5, wherein the step of detecting includes determining if the portable electronic device is within a predetermined distance from the communication port, and the step of downloading includes downloading the executable transaction application program via the wireless communication port to the portable electronic device when a determination is made that the portable electronic device is within the predetermined distance from the wireless communication port.

* * * * *